No. 840,971. PATENTED JAN. 8, 1907.
A. THEEL.
MOWER ATTACHMENT.
APPLICATION FILED DEC. 29, 1905.

WITNESSES:

INVENTOR
Albert Theel
BY
Pierre Barnes
ATTORNEY

UNITED STATES PATENT OFFICE.

ALBERT THEEL, OF LYNDEN, WASHINGTON.

MOWER ATTACHMENT.

No. 840,971. Specification of Letters Patent. Patented Jan. 8, 1907.

Application filed December 29, 1905. Serial No. 293,712.

*To all whom it may concern:*

Be it known that I, ALBERT THEEL, a citizen of the United States, residing at Lynden, in the county of Whatcom and State of Washington, have invented certain new and useful Improvements in Mower Attachments, of which the following is a specification, reference being had therein to the accompanying drawings, in which—

Figure 1:
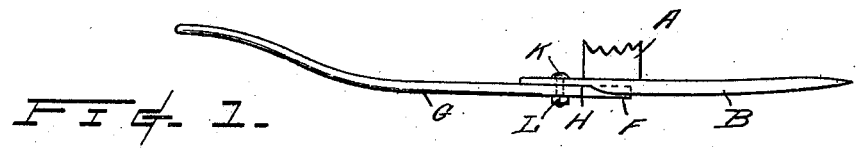
Figure 2:
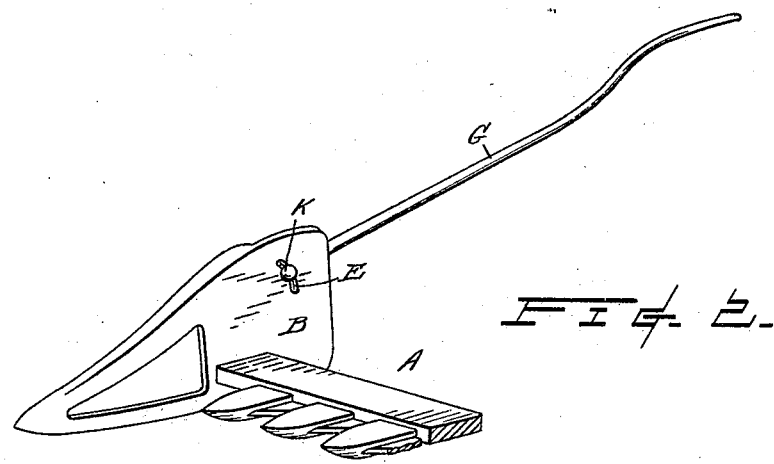
Figure 3:
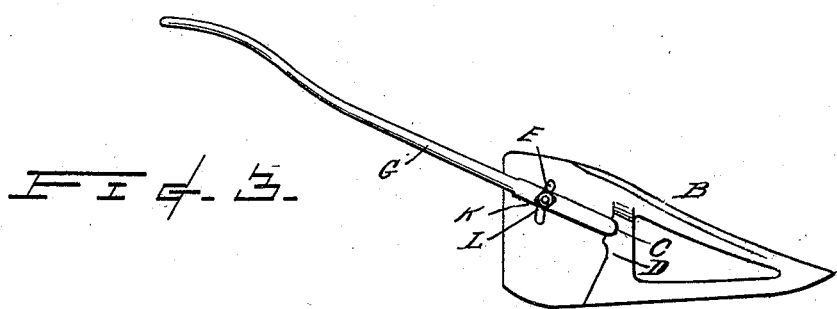

Figure 1 is a plan view of the invention shown attached to a sickle-bar shoe of a mowing-machine. Figs. 2 and 3 are respectively a perspective view and a side elevation of the same, and Fig. 4 is a side elevation of the sickle-bar shoe with the divider-bar detached.

The present invention relates to an improvement in the class of mowing-machine attachments known as "dividers," wherein I provide a bar of a peculiar shape which is adapted to be adjustably secured to the machine and capable of effectually turning or turning down swaths away from the uncut or standing grass or grain.

The invention consists of the novel construction and adoption of a divider-bar to the aforesaid uses, together with the manner of securing the bar to a sickle-bar shoe and in combination with the latter, all of which will now be explained.

In the said drawings the reference-letter A represents a portion of a mower sickle-bar having rigidly secured to its outer end a shoe B of ordinary or suitable construction. Formed or provided in the outer face desirably of this shoe and centrally of its length is a socket C, which, in the illustrated example, is formed in the rear edge of a reinforcing-rib D of the shoe. Intermediate of said socket and the back edge of the shoe is an arc-shaped slot E, disposed concentrically of the socket and at a somewhat higher elevation. Seated in the said socket is the forward end F of the divider-bar G, which extends backwardly in an inclined plane therefrom across the said slot and to some distance to the rear of the shoe, where it is given a partial convolution and terminates at some distance inwardly from a vertical plane projected through the shoe, as shown in Fig. 1, and above the swath cut by the machine.

The portion of the divider-bar adjacent of the shoe is flattened, as at H, to afford a large contacting surface to bear against the shoe, and it is firmly held thereagainst by a screw-bolt K, passing through an aperture of the divider-bar and the said slot, when a nut L is screwed down upon the bolt to bear against this bar. By reason of the slot said bolt can be predeterminately moved to various positions to regulate the amount of inclination of the divider-bar, which swings about its forward extremity as a fulcrum within the socket provided.

In operation the cut grass or the like which stands in proximity of the outer edge of the swath is swept inwardly by the divider-bar and gradually toppled away from the uncut grass and which action is accomplished very satisfactorily through the peculiar formation of the bar, which is straight for some distance from the heel end of the shoe and gradually directs the cut grass as the machine progresses into the range of the helically-curved end of the bar, whereby it is readily overturned upon the ground.

Having described my invention, what I claim as new, and desire to secure by Letters Patent, is—

The combination with a sickle-bar shoe having a curved slot and having a rib on its outside surface, said rib being formed with a semicircular socket, of a divider-bar having one end seated in said socket and having a portion of its body flat and having its other end curved, a bolt carried by said divider-bar, said bolt working in the curved slot, thereby forming means for the adjustment of said divider-bar.

In testimony whereof I affix my signature in presence of two witnesses.

ALBERT THEEL.

Witnesses:
E. C. BROOKS,
JOHN PRENGSCHAT.